July 27, 1971 — A. COSANI — 3,595,948
PROCESS FOR THE INDUSTRIAL PRODUCTION OF BALLS, BALLOONS AND HOLLOW BODIES WHICH MAY BE INFLATED, FOR RECREATIVE AND SPORTING USE
Filed Aug. 22, 1969
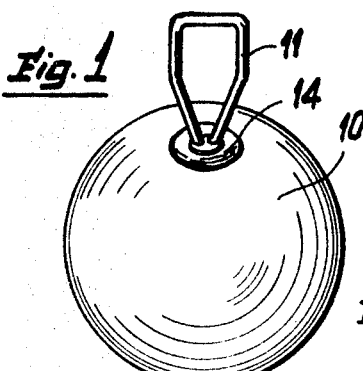
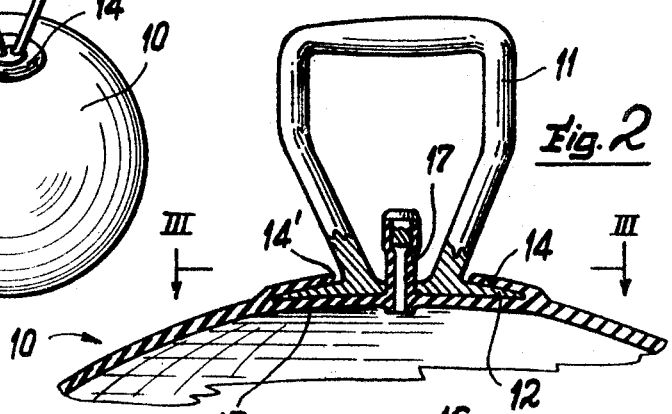
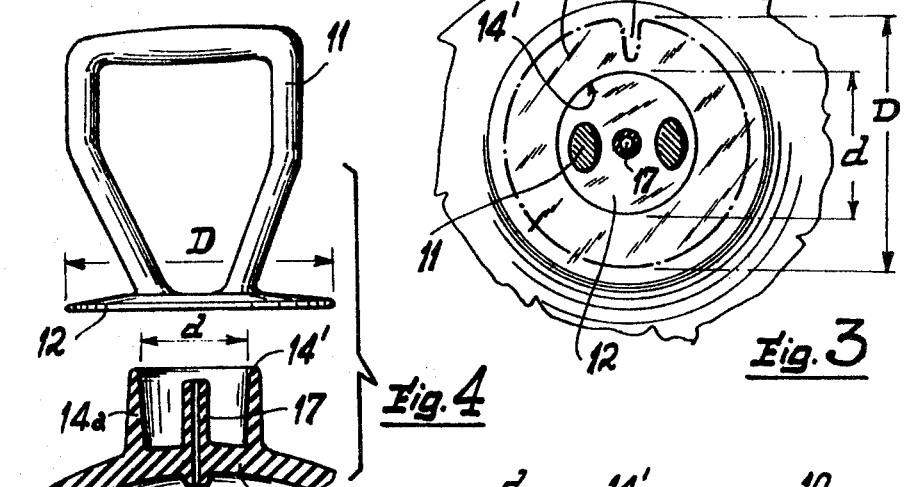
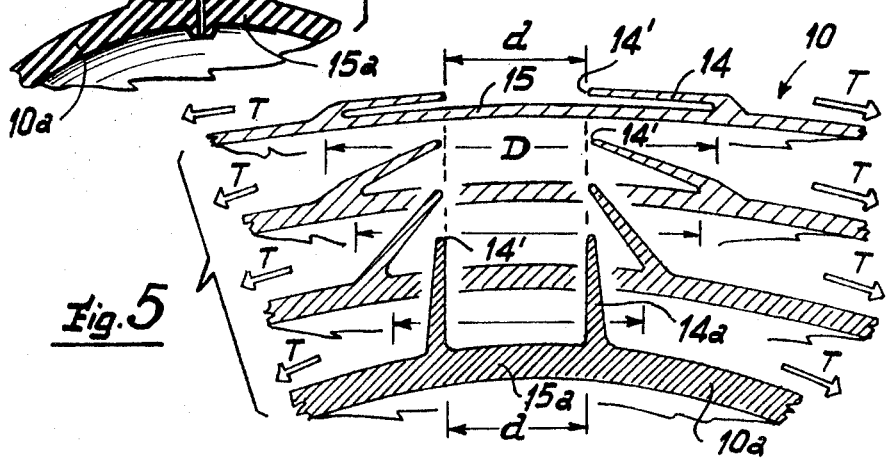
INVENTOR.
AQUILINO COSANI
BY
Michael S. Hurler
Attorney

United States Patent Office 3,595,948
Patented July 27, 1971

3,595,948
PROCESS FOR THE INDUSTRIAL PRODUCTION OF BALLS, BALLOONS AND HOLLOW BODIES WHICH MAY BE INFLATED, FOR RECREATIVE AND SPORTING USE
Aquilino Cosani, 33010 Osoppo (Udine), Italy
Filed May 22, 1969, Ser. No. 826,845
Claims priority, application Italy, May 24, 1968,
16,863/68
Int. Cl. B29c *17/06*
U.S. Cl. 264—94         6 Claims

ABSTRACT OF THE DISCLOSURE

The present process relates to the formation of end hollow bodies by expansion of a hollow body to very reduced dimensions with formation of inwardly converging end pieces and leading to the formation of a converging flange or pocket, adapted to receive a flange forming the base of the handle or the member to be connected to the hollow body.

---

The present invention relates to a process by which hollow bodies, consisting of essentially elastic material, such as thermoplastic synthetic material, a natural or synthetic rubber may be produced, with one or more zones of the surface of which connected to, and made integral with a structurally heterogeneous member. More particularly, this invention relates to a method for the production of balls, or play balloons, provided with a handle or handgrip for the launching, gripping the balloon and proceeding springwise thereon and the like. Obviously, the process according to the present invention extends to any equivalent application, for example for producing balloons and hollow bodies for other uses, such as for the formation of buoyants used to signal or to delimit water edges, forced passageways or others, which should be integral with rings for their connection to the anchoring means, to the rod bottom for barriers and others, as well as for the production for example of inflatable type buoyants, provided with rowlocks, rings and handgrip means for towing cables, and others.

The present invention also relates to products, obtainable according to the said process, such as balls and balloons with handles, and other products and items, being prevalently for, but not with limitation to, recreative and sporting use, such as the products exemplified above or other technologically equivalent items.

It is well known that making integral with the surface of hollow bodies in general, consisting particularly of elastically extensible material, parts and heterogeneous components, particularly of substantially a rigid nature, involves difficulties which at times result in conditions of incompatibility and practical impossibility.

Part of the materials, e.g. some plastics, cannot be welded or however safely connected to other materials.

The co-vulcanisation heat-welding system and others are not always possible and require, however, structural conditions which cannot always be complied with for the presentation and relevant engagement between the parts. Furthermore, the connection by direct adhesion through any system whatsoever between the parts of different elastic deformability is always difficult and generally unsafe, because the more elastic or deformable part is locally locked up in its zone adhering to the less deformable part, and each change in the deformation of the adjacent zones leads to alterations, surface irregularities and may be a cause for detachment.

Other inconveniences, difficulties and limitations are all well known to those skilled in the art.

With the foregoing in mind, it is the object of this invention to provide a process leading to overcome and to eliminate the above-outlined inconveniences and to the solution of the technical problems encountered at present in the engagement of heterogeneous parts one of which is constituted by the surface of an inflatable hollow body of the indicated type or equivalent, and the execution of industrial products, obtained from the application of said process.

Essentially, the process exploits the possibility of producing the hollow body by expansion through even partly permanent deformation, starting from a hollow body of originally much smaller dimensions, and originally integral at the point or points whereat it should be connected to the heterogeneous component or components with a tubular end piece, such as a cylinder or a frustum or cone or the like, one base of which is integral with the material of the inflatable body, and the exploitation of the surface expansion of said hollow body for converting said end piece, the said base of which is forced to follow such expansion into a flange or annular pocket opposing to the expanded zone, circumscribed by the above-indicated base and in which the perimetral portion of a base may stably link, being, in turn, shaped like a flange, handle, ring or however the heterogeneous member to be engaged with the inflated body. These and other more specific features of application of the above-mentioned inventive conception, together with an example of practical embodiment of the invention, will be better understood in the course of the following detailed description, referred to the accompanied table of drawings, in which:

FIG. 1 represents a balloon with handles of considerable dimensions, produced according to the process of this invention;

FIG. 2 fragmentarily shows and in diametral section the cap of said balloon, made integral with the handle, and in its regular service inflated condition;

FIG. 3 fragmentarily represents the same cap as above, in view and section in the direction and the plane indicated by III—III in FIG. 2;

FIG. 4 shows in side view and section the handle and the hollow body, respectively, before its expansion, and FIG. 5 shows in section and a purely representative form the sequence of the deformation phenomena leading to the conversion of the non-expanded body in FIG. 4 into the expanded body in FIG. 2, with which the heterogeneous component may be made integral.

Now referring to the figures in the drawing, the process according to the present invention may be advantageously and characteristically used for producing for example a big balloon 10, consisting of natural or synthetic rubber, considerably elastic plastics, such as chlorovinyl thermoplastic resin and others, integral with a handle 11, which should be ruggedly anchored to the inflated body in order to allow the use particularly for recreative and/or gymnastic training purposes. The engagement between the two parts is carried out exclusively by mechanical linking, obtained from the introduction of the perimetral portion of a flange 12, integral with said handle, made from essentially rigid material (metal, substantially rigid plastics, or others) and in one or more components, in an annular pocket, formed between an inwardly turned flange 14 and the underlying circular portion of the same hollow body 10, said parts 14 and 15 being formed in one single piece with the same hollow body 10.

For the formation of said flange which it would be impossible to obtain by adopting the art technological knowledge, the technical solutions as particularly deducible from FIGS. 4 and 5 will be applied.

The hollow body 10 is made by expansion of an originally smaller hollow body of heavier thickness, such as the body fragmentarily represented and designated 10a in said FIGS. 4 and 5. The expansion of said body may be obtained by exclusively exploiting the elastic expansibility of the component material (such as a natural or synthetic rubber) and/or the eventual hot-deformability, for example when for the production of the hollow body polyvinyl chloride or equivalent thermoplastic resin is used. The original hollow body 10a is integrally made with an annular hollow, for example, but not necessarily a cylindrical end piece 14a, integral at the base with the hollow body, and of diameter $d$ being equal or inferior to the internal diameter of the flange part 14 to be produced. The expansion of the circular zone 15a, circumscribed by the base of the annular hollow end piece 14a, lends to a corresponding expansion of said end piece at its base. The swelling of the starting body 10a (caused for example by admitting therein possibly heated compressed air) lends in fact to the application of a tangential tension T, which is applied in any direction on each point of said body.

The free edge 14' of the end piece 14a resists such expansion, not being subjected to said tangential tension.

The expansion is continued until the base of said end piece 14a reaches the desired diameter D necessary for the housing of the base flange 12 of the handle 11 of corresponding diameter D. FIG. 5 exemplifies the sequence of the differentiated deformation undergone by said parts, with the increase of the diameter from $d$ to $D$ of the zone considered of the hollow body, and leading to the conversion of the end piece 14a into the converging flange 14 serving as perimetral housing of the base flange 12 of the handle, or other component to be made integral with the hollow body. The height of the end piece 14a should obviously correspond at least to the radial dimension of the flange 14 to obtain. The flange 12 of the handle may be advantageously provided with a radial notch 16 in order to ease its introduction underneath the flange 14. Such flange 12 may be further advantageously drilled in order to ensure the passage of the tube or small valve 17 for the inflation of the hollow body, serving also as centering means for said handle or others.

Obviously, the dimensioning of the said parts, the tridimensional configuration of the starting hollow body and the end piece or end pieces of the annular type designed to superpose marginally to the flange or base flanges of the handles, rings or other components to be engaged with the hollow body, could be varied from case to case depending upon the specific requirements, the extent of the deformation which it is possible or convenient to impose upon the hollow body, in expansion phase, and others. Obviously, in order to obtain the desired effects, it is necessary that the increase of the diameter from $d$ to $D$ of the zone considered of the hollow body is at least equal to the double of the height of the end piece to be deformed, so as to obtain that the converging flange 14 sets and tends to remain well adhering to the underlying part 15 being expanded on the surface.

However, since the product obtainable according to the invention has been described and represented only by way of example of its performance, it is understood that the above-described modalities as well as the industrial products, consequent upon the application of the same, could undergo several changes and modifications, depending upon the specific requirements and conveniences, all without departing from the scope of the present invention.

What we claim is:

1. A process for the production of hollow bodies having means adapted for the insertion of heterogeneous members which comprises forming an inflatable, hollow body of a first dimension having an integral, essentially tubular section projecting from the surface thereof; inflating said hollow body to expand said hollow body to a second, larger dimension and to circumferentially stretch at least the portion of said integral, essentially tubular section which is in closest proximity to the surface of said hollow body while leaving at least the portion of said integral, essentially tubular section which is farthest from the surface of said hollow body in substantially unstretched condition, whereby an essentially flat, annular pocket is formed on the surface of said hollow body; and maintaining said hollow body at said second, larger dimension.

2. A process as defined in claim 1, wherein the diameter of said essentially tubular section prior to stretching is approximately one-half the difference between the diameters of said essentially tubular section subsequent to and prior to stretching.

3. A process as defined in claim 1, wherein said tubular section is essentially cylindrical.

4. A process as defined in claim 1, wherein said hollow body comprises a play balloon and said heterogeneous member comprises an essentially rigid component including a handle and a disk-shaped flange secured to one end portion of said handle, said flange being designed to be received into and held within said formed, flat, annular pocket.

5. A process as defined in claim 4, wherein said flange comprises an essentially radial notch inwardly recessed from its contour, to facilitate the insertion of said flange into said pocket.

6. A process as defined in claim 4, wherein said play balloon comprises a valve means adapted for the introduction of gas into said balloon and said flange has therein an opening adapted for the passage therethrough of said valve means.

No references cited.

ROBERT F. WHITE, Primary Examiner

T. J. CARVIS, Assistant Examiner